United States Patent
Jeon

(10) Patent No.: US 10,013,788 B2
(45) Date of Patent: Jul. 3, 2018

(54) METHOD AND SYSTEM FOR GENERATING CROWD ANIMATION AND COMPUTER-READABLE RECORDING MEDIUM

(71) Applicant: Jae Woong Jeon, Seoul (KR)

(72) Inventor: Jae Woong Jeon, Seoul (KR)

(*) Notice: Subject to any disclaimer, the term of this patent is extended or adjusted under 35 U.S.C. 154(b) by 0 days.

(21) Appl. No.: 14/436,086

(22) PCT Filed: Oct. 16, 2013

(86) PCT No.: PCT/KR2013/009262
§ 371 (c)(1),
(2) Date: Apr. 16, 2015

(87) PCT Pub. No.: WO2014/062003
PCT Pub. Date: Apr. 24, 2014

(65) Prior Publication Data
US 2015/0262406 A1 Sep. 17, 2015

(30) Foreign Application Priority Data
Oct. 16, 2012 (KR) .................. 10-2012-0114782

(51) Int. Cl.
G06T 13/40 (2011.01)
G06F 3/0484 (2013.01)
G06T 19/00 (2011.01)
G06T 19/20 (2011.01)

(52) U.S. Cl.
CPC ............ G06T 13/40 (2013.01); G06F 3/0484 (2013.01); G06T 19/003 (2013.01);
(Continued)

(58) Field of Classification Search
CPC ................. G06T 13/40; G06T 15/02; G06T 2207/30241; G06T 13/20; G06T 15/005;
(Continued)

(56) References Cited

U.S. PATENT DOCUMENTS

2005/0195195 A1* 9/2005 Brunet ................... G06T 13/80
345/473

FOREIGN PATENT DOCUMENTS

KR 10-2010-0062788 A 6/2010

OTHER PUBLICATIONS

Gu et al., Formation Sketching: An Approach to Stylize Groups in Crowd Simulation, Graphics Interface 2011, pp. 1-8.*
(Continued)

*Primary Examiner* — Haixia Du
(74) *Attorney, Agent, or Firm* — Dinsmore & Shohl LLP

(57) ABSTRACT

The present invention relates to a method, a system, and a computer-readable recording medium for generating a crowd animation. One embodiment of the present invention relates to the method for creating the crowd animation, comprising the steps of: (a) generating a guide shape of a crowd including one or more characters by referencing a first user operation, wherein the guide shape defines the formation and/or the number of the one or more characters included in the crowd; (b) generating a guide path for defining a motion path of the one or more characters included in the crowd by referencing a second user operation, which is inputted with respect to the guide shape; and (c) generating the crowd animation in which the one or more characters included in the crowd move along the motion path that is defined by the guide path in the formation defined by the guide shape.

17 Claims, 15 Drawing Sheets

(52) U.S. Cl.
CPC ............ *G06T 19/006* (2013.01); *G06T 19/20* (2013.01); *G06T 2200/24* (2013.01); *G06T 2213/08* (2013.01); *G06T 2219/008* (2013.01); *G06T 2219/2004* (2013.01); *G06T 2219/2008* (2013.01); *G06T 2219/2016* (2013.01)

(58) Field of Classification Search
CPC ..... G06T 19/006; G06T 2213/00; G06T 1/00; G06T 2207/20021; G06T 7/12; G06T 9/005; G06T 9/007; A63F 2300/66; A63F 13/40; A63F 13/60; A63F 13/79
See application file for complete search history.

(56) References Cited

OTHER PUBLICATIONS

Kwon et al., Group Motion Editing, ACM Transactions on Graphics, vol. 27, No. 3, Article 80 (Aug. 2008), 8 pages.*

Park, Min Ji, "Crowd simulation using Sketch-based Interface", Electric Computer Science and Engineering, Feb. 2010, Seoul National University, Seoul, Korea.

Oshita, Masaki et al., "Sketch-based Interface for Crowd Animation", In: 9th International Symposium on Smart Graphics 2009, Springer, 2009, pp. 253-262.

Jeon Jaewoong et al., "A sketch interface to empower novices to create 3D animations", Computer Animation and Virtual Worlds, 2010, vol. 21, pp. 423-432.

Ulicny Branislav et al., "Crowdbrush: Interactive Authoring of Real-time Crowd Scenes", In: Eurographics/ACM SIGGRAPH Symposium on Computer Animation, 2004, pp, 243-252.

Korean Intellectual Property Office, International Search Report and Written opinion for PCT Application PCT/KR2013/009262, dated Feb. 14, 2014.

* cited by examiner (a)

(b)

(a)

(b)

(a)

(b)

(a)

(b)

(c)

(a)

(b)

(c)

(a)

(b)

METHOD AND SYSTEM FOR GENERATING CROWD ANIMATION AND COMPUTER-READABLE RECORDING MEDIUM

FIELD OF THE INVENTION

The present invention relates to a method, a system, and a computer-readable recording medium for generating a crowd animation. More particularly, the present invention is related to a method, a system, and a computer-readable recording medium for generating a crowd animation, wherein a guide shape for a crowd including at least one character is generated with reference to a first user operation, and a guide path for specifying a motion path of the at least one character included in the crowd is generated with reference to a second user operation inputted with respect to the guide shape, thereby generating the crowd animation in which the at least one character included in the crowd moves, making a motion, in a formation specified by the guide shape and along the motion path specified by the guide path.

BACKGROUND

The field of crowd animation has recently been in the spotlight due to the development of computer graphics technology and graphics hardware. Further, in a variety of fields such as computer games, TV programs and movies, general users are often encountering crowd animations in which multiple characters move and interact with each other.

Crowd animation has been researched in various directions over the past few decades. Among those, researches have been made mainly based on agent models to control a crowd of characters, animals or the like using behavioral models and scripted behaviors. Further, researches have also been made on data-driven crowd simulation based on actual data of the real world.

Particularly in prior arts, in order to make a change to a crowd animation, a user is required to personally adjust a variety of complicated attribute values and limit values or collect the attribute and limit values in a data-driven manner, which is a difficult and time-consuming task even for an expert in producing crowd animations. Further, it takes some time until the user may check the result of adjusting the attribute and limit values after the adjustment, and the procedure for the adjustment is not intuitive. Thus, the user needs to inconveniently repeat the adjustment procedure several times in order to obtain a desired result for the crowd animation.

Notwithstanding, there are insufficient user interfaces and systems to allow general users including beginners to easily produce (i.e., generate) crowd animations. Further, since a formation of a crowd is a vitally important element in the field of crowd animation, there is a need for a technique to allow a user to configure and change the formation of a crowd animation in real time using a graphical user interface.

SUMMARY OF THE INVENTION

One object of the present invention is to solve all the above problems in prior art.

Another object of the invention is to generate a guide shape for a crowd including at least one character with reference to a first user operation, and generate a guide path for specifying a motion path of the at least one character included in the crowd with reference to a second user operation inputted with respect to the guide shape, thereby generating a crowd animation in which the at least one character included in the crowd moves, making a motion, in a formation specified by the guide shape and along the motion path specified by the guide path.

According to one aspect of the invention to achieve the objects as described above, there is provided a method for generating a crowd animation, comprising the steps of: (a) generating a guide shape for a crowd including at least one character with reference to a first user operation, wherein the guide shape specifies at least one of a formation and a number of the at least one character included in the crowd; (b) generating a guide path for specifying a motion path of the at least one character included in the crowd with reference to a second user operation inputted with respect to the guide shape; and (c) generating the crowd animation in which the at least one character included in the crowd moves in the formation specified by the guide shape and along the motion path specified by the guide path.

According to another aspect of the invention, there is provided a system for generating a crowd animation, comprising: a guide shape management unit to generate a guide shape for a crowd including at least one character with reference to a first user operation, wherein the guide shape specifies at least one of a formation and a number of the at least one character included in the crowd; a guide path management unit to generate a guide path for specifying a motion path of the at least one character included in the crowd with reference to a second user operation inputted with respect to the guide shape; and an animation generation unit to generate the crowd animation in which the at least one character included in the crowd moves in the formation specified by the guide shape and along the motion path specified by the guide path.

In addition, there are further provided other methods and systems to implement the invention, as well as computer-readable recording media having stored thereon computer programs for executing the methods.

According to the invention, there may be provided a sketch-based user interface to allow non-professional general users to easily produce a 3D crowd animation.

According to the invention, it is not only possible to control all of multiple characters included in a crowd, but also to independently control each group consisting of the characters included in the crowd or each of the characters included in the crowd.

According to the invention, a user may visually and intuitively adjust various animation attributes for a formation and a motion path of characters included in a crowd (e.g., a path in which they move making a motion, a moving speed, a motion made during the movement, and variables each applied thereto).

According to the invention, even during the playback of a crowd animation, a user may edit (e.g., modify) animation attributes for a formation and a motion path of characters included in a crowd in real time, as desired.

DETAILED DESCRIPTION OF THE PREFERRED EMBODIMENTS

Figure 1:
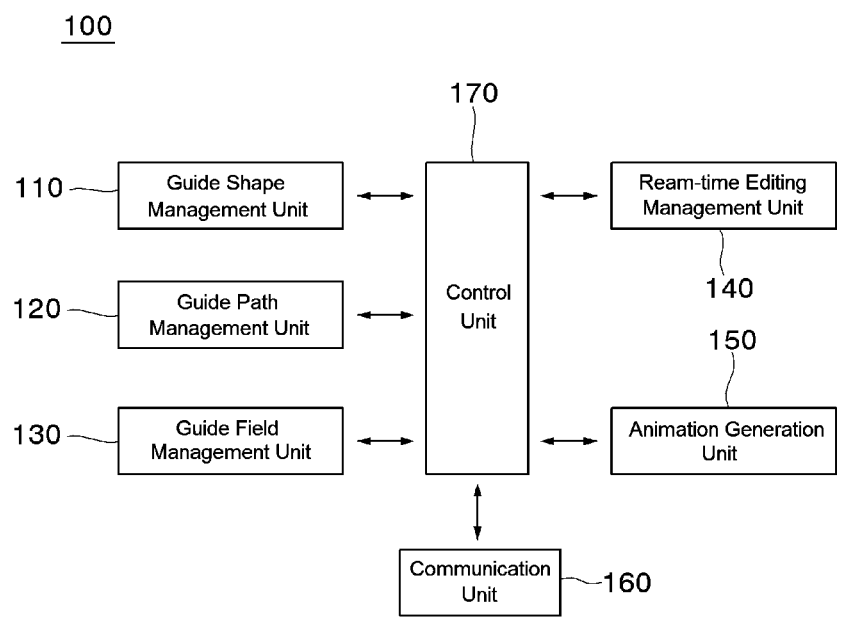
FIG. 1 illustratively shows the internal configuration of a crowd animation generation system according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the locations or arrangements of individual elements within each of the disclosed embodiments may also be modified without departing from the spirit and scope of the invention. Therefore, the following detailed description is not to be taken in a limiting sense, and the scope of the invention, if properly described, is limited only by the appended claims together with all equivalents thereof. In the drawings, like reference numerals refer to the same or similar functions throughout the several views.

Hereinafter, preferred embodiments of the present invention will be described in detail with reference to the accompanying drawings to enable those skilled in the art to easily implement the invention.

Configuration of a Crowd Animation Generation System

Hereinafter, the internal configuration of the crowd animation generation system crucial for implementing the present invention and the functions of the respective components thereof will be discussed.

According to one embodiment of the invention, any type of device having memory means and a microprocessor for computing capabilities, such as a personal computer (e.g., a desktop computer, a notebook computer, and the like), a server, a workstation, a personal digital assistant (PDA), a web pad, a mobile phone, a smartphone, and a tablet PC, may be adopted as the crowd animation generation system of the present invention. In particular, the crowd animation generation system according to one embodiment of the invention may comprise a touch screen that may receive sketch operations from a user, and display means that may display a crowd animation.

FIG. 1 illustratively shows the internal configuration of a crowd animation generation system according to one embodiment of the invention.

Referring to FIG. 1, a crowd animation generation system 100 according to one embodiment of the invention may comprise a guide shape management unit 110, a guide path management unit 120, a guide field management unit 130, a real-time editing management unit 140, an animation generation unit 150, a communication unit 160, and a control unit 170. According to one embodiment of the invention, at least some of the guide shape management unit 110, the guide path management unit 120, the guide field management unit 130, the real-time editing management unit 140, the animation generation unit 150, the communication unit 160, and the control unit 170 may be program modules to communicate with an external system (not shown). The program modules may be included in the crowd animation generation system 100 in the form of operating systems, application program modules and other program modules, while they may be physically stored on a variety of commonly known storage devices. Further, the program modules may also be stored in a remote storage device that may communicate with the crowd animation generation system 100. Meanwhile, such program modules may include, but not limited to, routines, subroutines, programs, objects, components, data structures and the like for performing specific tasks or executing specific abstract data types as will be described below in accordance with the invention.

First, according to one embodiment of the invention, the guide shape management unit 110 may function to generate a guide shape for specifying a formation and a number of at least one character included in a crowd, with reference to a first user operation inputted via a sketch-based interface. Here, the guide shape may be specified on a virtual plane where the at least one character included in the crowd exists. Further, the first user operation refers to an operation for specifying a virtual area including the at least one character on a screen comprised of a touch screen or the like. For example, the operation may be to draw an area shaped in a polygon, a circle, an ellipse, or the like.

Figure 2:
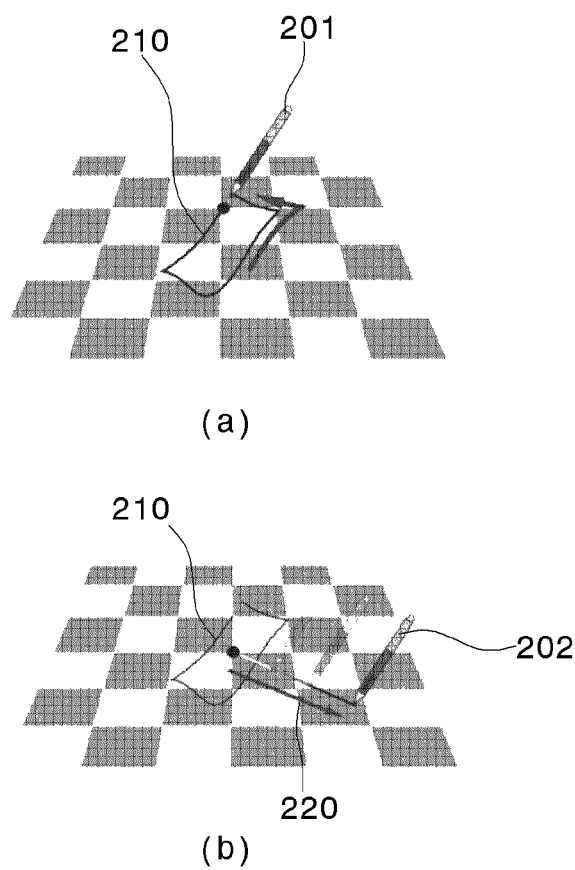
FIG. 2 illustratively shows how to generate a guide shape and a guide path according to one embodiment of the invention.

FIG. 2 illustratively shows how to generate a guide shape and a guide path according to one embodiment of the invention.

Referring to (a) of FIG. 2, a user may select at least one character to be included in a crowd. Here, one character may be included in the crowd, or multiple characters may be selected as desired by the user. Next, the user may draw a guide shape 210 having a desired size and shape on a screen to configure a formation to be formed by the at least one character included in the crowd using a sketch-based interface (201). The generated guide shape 210 may be projected onto a virtual plane where the characters exist in a 3D environment. According to one embodiment of the invention, the number of characters included in the crowd may be varied with the size of the guide shape 210, and the characters included in the crowd may be disposed in a formation according to the shape of the guide shape 210.

According to one embodiment of the invention, the guide shape drawn by the user may be a formation that the at least one character included in the crowd initially forms, and at the same time, may be a formation that the at least one character included in the crowd maintains when the crowd moves making a motion along a guide path to be described below.

Next, according to one embodiment of the invention, a function may be performed to generate a guide path for specifying a motion path in which the at least one character included in the crowd moves making a motion, with reference to a second user operation inputted with respect to the previously generated guide shape. Here, the second user operation may be to draw a virtual line such as a straight line or a curved line running from a first point to a second point on the screen.

Referring to (b) of FIG. 2, the user may select an icon by which the guide shape 210 may be selected (e.g., an icon displayed at the center of the guide shape) on the screen, and in that state, may use a sketch-based interface to draw a line 220 that corresponds to a path in which the guide shape is to be moved (202). Here, the trace of the line 220 drawn by the user may indicate a motion path of the characters included in the crowd corresponding to the guide shape 210.

Further, the moving speed of the characters included in the crowd corresponding to the guide shape 210 may be determined according to the speed at which the user draws the line 220. For example, the crowd corresponding to the guide shape 210 may move faster as the user draws the line 220 faster.

More specifically, according to one embodiment of the invention, a type of motion made by the characters included in the crowd corresponding to the guide shape may be adaptively determined according to the moving speed of the crowd. For example, the characters included in the crowd may move making a walking motion when the moving speed of the crowd is slower than a predetermined speed, and may move making a running motion when the moving speed of the crowd is faster than the predetermined speed. Of course, according to one embodiment of the invention, the motion made by the characters included in the crowd may be assigned as desired by the user. Specifically, the characters included in the crowd may be configured to make various motions according to the speed at which the user draws a line corresponding to the guide path, or the user may draw a line corresponding to the guide path in a state in which a specific motion is selected, so that the characters included in the crowd moving along the guide path may be configured to make the specific motion.

Meanwhile, according to one embodiment of the invention, the user may generate a guide path by using a sketch-based interface to select a guide shape and then draw a desired path, as described above. In that procedure, the trajectory in which the guide shape is moved on the screen along the generated guide path may be displayed on the screen. Here, the line drawn by the user on the screen may be projected onto a plane where the crowd exists in a 3D environment, and each point on the line may be approximated by a uniform cubic B-spline.

Next, according to one embodiment of the invention, the guide shape management unit 110 and the guide path management unit 120 may function to configure regularity of the guide shape or variety of the guide path, with reference to a third user operation inputted with respect to the guide shape or the guide path.

Figure 3:
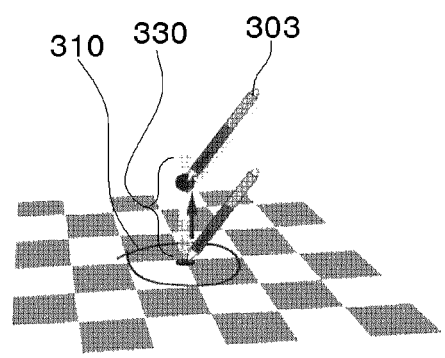
FIG. 3 illustratively shows how to configure regularity of the guide shape or variety of the guide path according to one embodiment of the invention.
Figure 3:
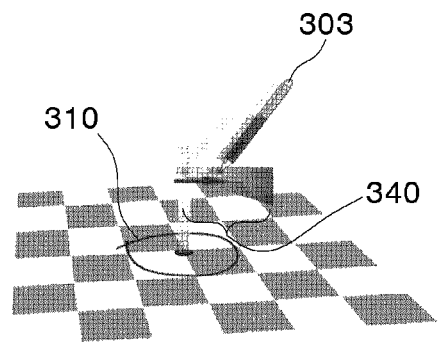

FIG. 3 illustratively shows how to configure regularity of the guide shape or variety of the guide path according to one embodiment of the invention.

Referring to (a) of FIG. 3, the user may use a sketch-based interface to input a third user operation 303 in upward and downward directions with respect to the guide shape 310 or the guide path, thereby configuring the degree to which the crowd corresponding to the guide shape 310 regularly maintains an initially configured formation while the crowd moves making a motion along the guide path (330). Further, referring to (b) of FIG. 3, the user may use a sketch-based interface to input a third user operation 303 in left and right directions with respect to the guide shape 310 or the guide path, thereby configuring the degree to which the motion path is variously changed when the crowd corresponding to the guide shape 310 moves making a motion along the guide path (340).

Of course, it is noted that the third user operation to configure the regularity of the guide shape or the variety of the guide path is not necessarily limited to the above, and may be changed without limitation as long as the objects of the invention may be achieved. For example, the regularity of the guide shape may be configured by the third user operation inputted on the left side from the center of the guide shape, and the variety of the guide path may be configured by the third user operation inputted on the right side from the center of the guide shape.

According to one embodiment invention, the movement pattern of the crowd may be categorized as a military type, a police type, a free-individual type, an animal type and the like, according to the regularity of the guide shape and the variety of the guide path. For example, for the military type having the highest regularity and the lowest variety, all of the characters included in the crowd may move making motions that perfectly coincide with each other, while maintaining a formation and a motion path as initially configured. Further, for the police type having high regularity and low variety, the characters included in the crowd may move maintaining a formation within a predetermined extent, similarly to the movement pattern of people crossing at a crosswalk, and a motion path thereof may be partially changed. Furthermore, for the free-individual type having low regularity and high variety, all of the characters included in the crowd may arrive at a destination, but a motion path thereof may be greatly changed. Lastly, for the animal type having the lowest regularity and the highest variety, a motion path of the characters included in the crowd may deviate greatly from a guide path, and some of the characters included in the crowd may not arrive at a destination.

Figure 4:
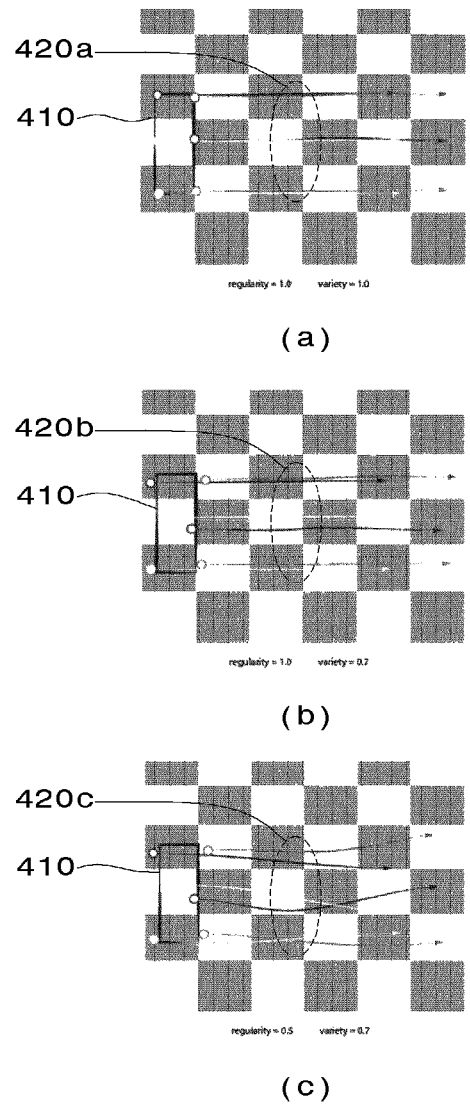
FIG. 4 illustratively shows how a formation and a motion path of characters included in a crowd are changed according to the regularity of the guide shape and the variety of the guide path according to one embodiment of the invention.

FIG. 4 illustratively shows how a formation and a motion path of characters included in a crowd are changed according to the regularity of the guide shape and the variety of the guide path according to one embodiment of the invention.

Referring to FIG. 4, the characters included in the crowd may move along a motion path according to the guide path, maintaining a formation according to the guide shape, when the regularity value of the guide shape is 1.0 (with greater values indicating higher regularity) and the variety value of the guide path is 1.0 (with greater values indicating lower variety) (see (a) of FIG. 4), may move slightly away from the motion path according to the guide path, slightly disordering the formation according to the guide shape, when the regularity value of the guide shape is 1.0 and the variety value of the guide path is 0.7 (see (b) of FIG. 4), and may move greatly away from the motion path according to the guide path, greatly disordering the formation according to the guide shape, when the regularity value of the guide shape is 0.7 and the variety value of the guide path is 0.7 (see (c) of FIG. 4).

Meanwhile, according to one embodiment of the invention, the guide shape management unit 110 may function to generate a primary guide shape 510 for a crowd including at least one character with reference to a first user operation 501 inputted via a sketch-based interface, generate a secondary guide shape 515 for the crowd including the at least one character with reference to a fourth user operation 504, and change a formation formed by the at least one character included in the crowd from a formation specified by the primary guide shape 510 to a formation specified by the secondary guide shape 515.

Further, according to one embodiment of the invention, the guide shape management unit 110 may allow a user to assign weights to the primary and secondary guide shapes to configure according to which of the primary and secondary guide shapes the characters included in the crowd will primarily form a formation.

Figure 5:
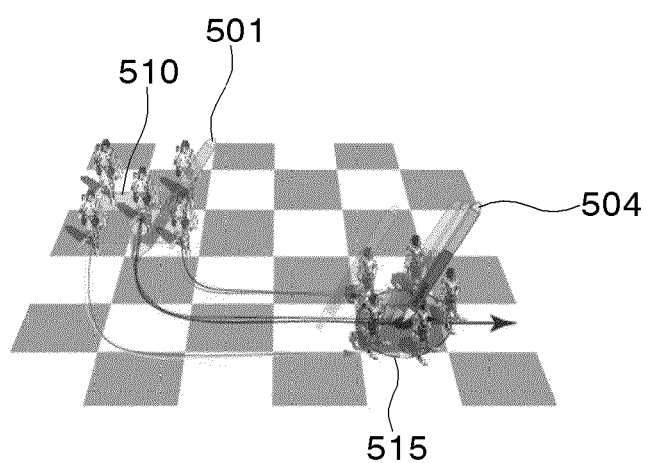
FIGS. 5 and 6 illustratively show how to generate a primary guide shape and a secondary guide shape according to one embodiment of the invention.
Figure 6:
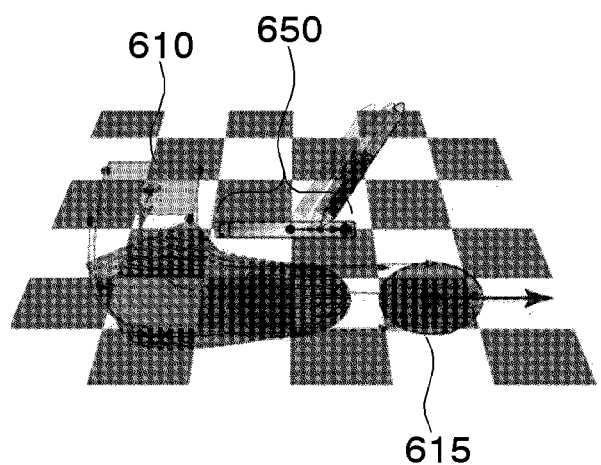

FIGS. 5 and 6 illustratively show how to generate a primary guide shape and a secondary guide shape according to one embodiment of the invention.

Referring to FIG. 5, a crowd animation of which formation may be variously changed may be generated using a sketch-based interface, as desired by the user. First, the user may sketch a secondary guide shape 515 corresponding to a desired formation at a point in which the formation of the crowd is desired to be changed. At this time, the user may configure the regularity of the secondary guide shape 515 together. Next, the user may sketch to input a guide path in a state in which a primary guide shape 510 is selected, so that the guide path may pass the previously generated secondary guide shape. In this case, the formation of the characters included in the crowd may be changed from a formation according to the primary guide shape 510 to a formation according to the secondary guide shape 515.

Referring to FIG. 6, for the crowd animation to which multiple guide shapes are applied as in FIG. 5, a graphical interface 650 may be provided to support the user to configure weights for a primary guide shape 610 and a secondary guide shape 615. The user may use the graphical user interface 650 to assign weights to the multiple guide shapes, thereby generating a desired crowd animation.

Next, according to one embodiment of the invention, the guide field management unit 130 may function to generate a guide field 760 that may make a change to a crowd animation with reference to a fifth user operation inputted on the screen. Further, according to one embodiment of the invention, the guide field management unit 130 may function to configure a motion that the characters to pass the guide field 760 among those included in the crowd will make when passing the guide field 760.

Figure 7:
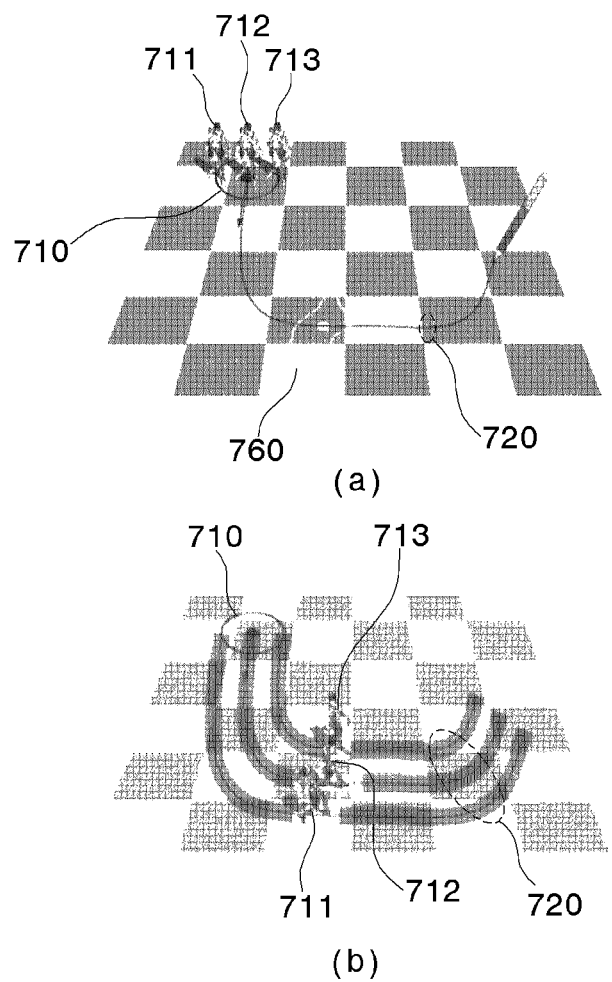
FIGS. 7 and 8 illustratively show how to generate a guide field according to one embodiment of the invention.
Figure 8:
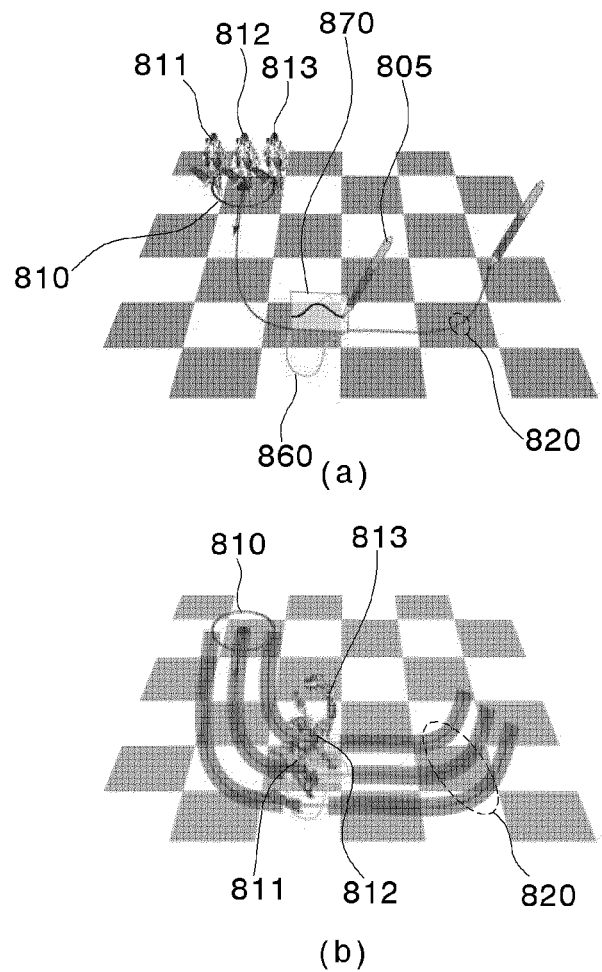

FIGS. 7 and 8 illustratively show how to generate a guide field according to one embodiment of the invention.

Referring to FIGS. 7 and 8, the guide field management unit 130 according to one embodiment of the invention may support the user to control a group behavior (e.g., a motion) to be made by the characters included in the crowd when passing a specific area, such as an area with an obstacle. For example, when a crowd 710 moving along a guide path 720 encounters a puddle 760, characters 711, 712, 713 included in the crowd may be configured to make a motion such as leaping or evading the puddle 760. Specifically, the characters 711, 712 to leap a wide part of the puddle may be configured to make a motion of taking a big leap, and the character 713 to leap a narrow part of the puddle may be configured to make a motion of taking a small leap or evading the puddle.

According to one embodiment of the invention, the user may generate a guide field at a desired point in advance of the generation of a guide path for the crowd, or may generate the guide field at the desired point after the guide path for the crowd has all been generated.

As described above, according to one embodiment of the invention, a predetermined change may be made to the motion of the characters included in the crowd passing an area where the guide field 760 is located. As in the above-described example, when a puddle is generated as the guide field 760, a change such as a big jump, a small jump and evading may be made to the motion of the characters 711, 712, 713 of the crowd passing the puddle, depending on the distance from the center of the guide field 760, the length of the motion path overlapping the guide field 760, or the like, and the motion path of the characters 711, 712, 713 of the crowd may be changed so that they evade and detour the puddle (see FIG. 7).

Further, according to one embodiment of the invention, the user may use a sketch-based interface 870 to input additional guide field configuration information with respect to a previously generated guide field 860. At this time, the guide field management unit 130 according to one embodiment of the invention may provide a virtual camera module for the guide field configuration, and the user may accordingly use the sketch-based interface and the virtual camera module to perform screen control such as scrolling or zooming and input the configuration information with respect to the guide field 860 with the provision of a screen convenient for the user (see FIG. 8).

Next, according to one embodiment of the invention, the real-time editing management unit 140 may function to change, in real time, a guide shape 1010 or a guide path 1020 applied to the crowd with reference to a sixth user operation 1060 inputted during the playback of a crowd animation.

According to one embodiment of the invention, there may be provided a sketch-based interface that may make various changes to the crowd animation in real time, i.e., on the fly. Specifically, the user may use the sketch-based interface according to the invention to make various changes to animation attributes such as a guide shape or a guide path for the crowd and a motion made by the characters included in the crowd, and to configure the number or range of the characters to which the changes are made among those included in the crowd.

Figure 9:
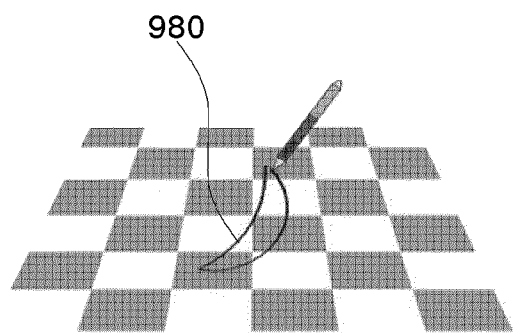
FIGS. 9 and 10 illustratively show how to edit animation attributes such as a guide shape and a guide path of a crowd animation in real time according to one embodiment of the invention.
Figure 9:
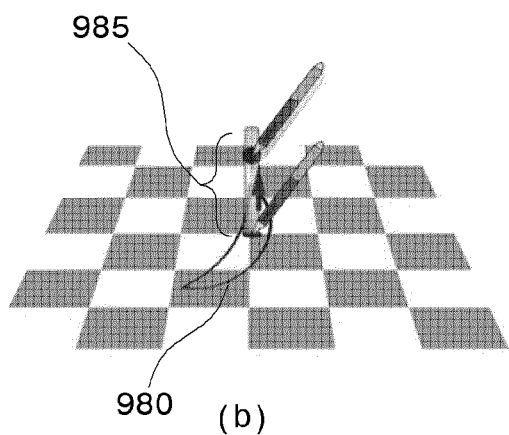
Figure 10:
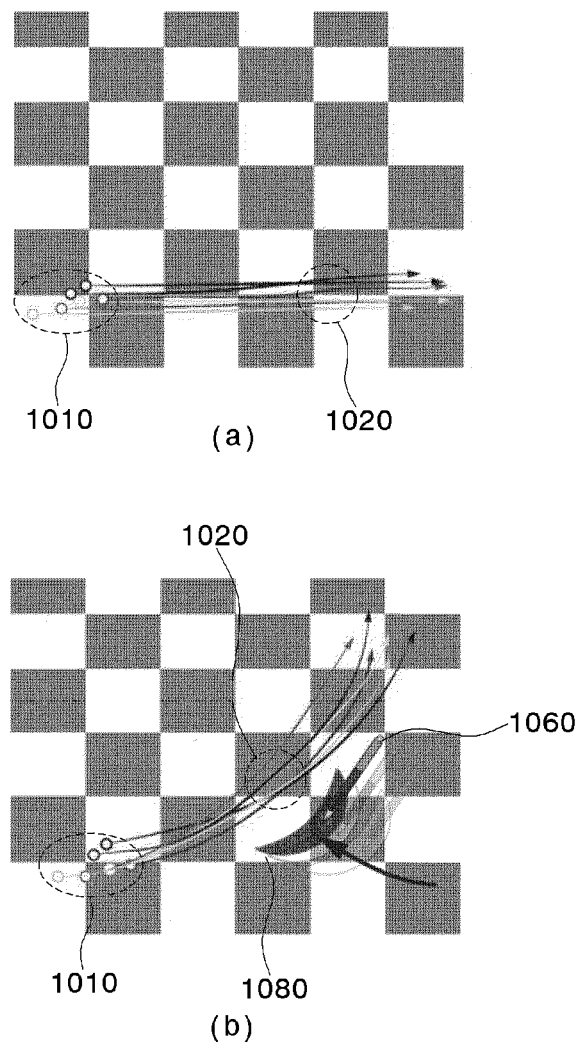

FIGS. 9 and 10 illustratively show how to edit attributes such as a guide shape and a guide path of a crowd animation in real time according to one embodiment of the invention.

Referring to FIG. 9, the user may use a sketch-based interface to generate an editing shape (so-called a shepherd shape) 980 to be used for real-time editing on the screen, and may use the generated editing shape to input an operation 1060 for real-time editing of the crowd animation (see (a) of FIG. 9). Further, according to one embodiment of the invention, the user may use a sketch-based interface 985 to input a variety of configuration information with respect to the generated editing shape (see (b) of FIG. 9).

For example, the degree to (i.e., intensity with) which the crowd animation is edited may be configured by the editing shape 980. Specifically, all of the characters included in the crowd encountering the editing shape 980 may be influenced by an editing command when the editing intensity of the editing shape 980 is configured as a maximum intensity, and the characters included in the crowd encountering the editing shape 980 may be influenced by an editing command with a probability of 50% when the editing intensity of the editing shape 980 is configured as an intensity of 50%.

Referring to FIG. 10, the user may use a sketch-based interface to input an operation 1060 for bringing an editing shape 1080 close to a guide path 1020 in which the crowd moves during the playback of the crowd animation, thereby intuitively changing a formation 1010 or a motion path 1020 of the characters included in the crowd within the range of influence of the editing shape 1080, like a shepherd driving sheep. That is, according to one embodiment of the invention, while viewing the playback of a previously created crowd animation, a user may edit the crowd animation on the fly at a desired point and at a desired time.

Although the embodiments in which the guide shape 1010 or the guide path 1020 applied to a crowd is changed in real time during the playback of a crowd animation have been mainly described above, it is noted that the embodiments of the invention are not necessarily limited to the above-described ones. That is, according to another embodiment of the invention, even while a crowd animation is being displayed and visually provided to a user (e.g., before it is played or while it is paused), not necessarily during the playback thereof, the user may use a sketch-based interface to input an operation for bringing an editing shape close to a guide path in which the crowd moves, thereby changing a formation or a motion path of the characters included in the crowd within the range of influence of the editing shape on the fly, like a shepherd driving sheep.

Meanwhile, according to one embodiment of the invention, the crowd animation generation system 100 may allow editing or modifying of a crowd animation to be performed per entire characters included in the crowd, per group consisting of multiple characters included in the crowd, or per each character included in the crowd.

FIGS. 11 to 14 illustratively show how to control animation attributes per entire crowd, per group consisting of characters included in the crowd, or per each character included in the crowd according to one embodiment of the invention.

Figure 11:
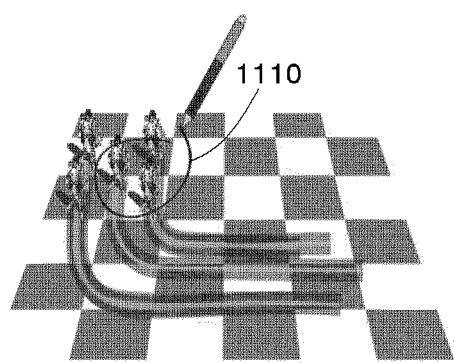
FIGS. 11 to 14 illustratively show how to control animation attributes per entire crowd, per group consisting of characters included in the crowd, or per each character included in the crowd according to one embodiment of the invention.
Figure 11:
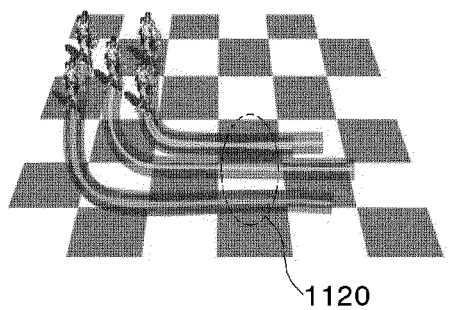

Referring to FIG. 11, the user may use a sketch-based interface to only select at least some characters 1110 from among multiple characters included in the crowd, and may separately assign attribute information such as a motion and a motion path 1120 to the selected characters, thereby configuring the corresponding characters to behave differently from the other characters in the crowd. Here, the animation-related attribute information assigned to the crowd, the character group, or each character may be stored and managed by the crowd animation system 100, and thereafter the user may retrieve and assign the attribute information stored in the crowd animation system 100 to a crowd, a character group, or each character as desired by the user.

Figure 12:
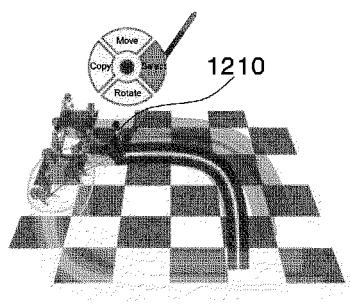
Figure 12:
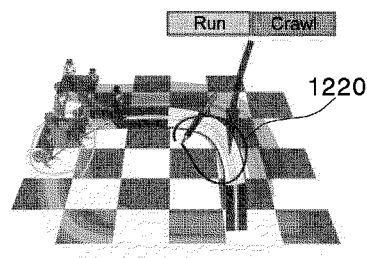
Figure 12:
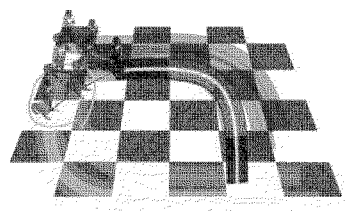

Referring to FIG. 12, the crowd animation may be edited or modified per each character 1210 included in the crowd. According to one embodiment of the invention, the attribute values for a type of motion made by the character, a motion path 1220 of the character, and the like may be changed via a sketch-based interface.

Figure 13:
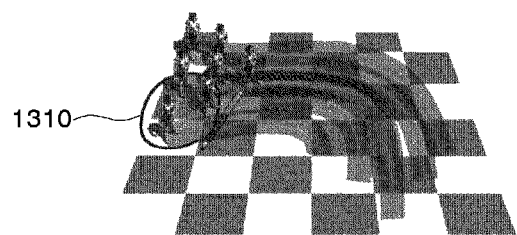
Figure 13:
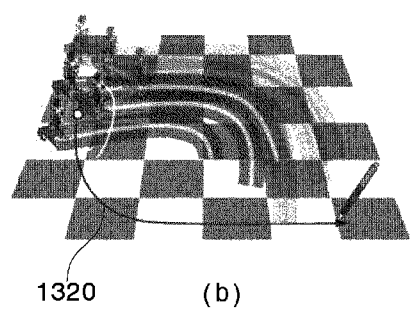
Figure 13:
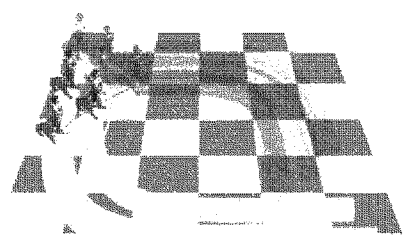

Referring to FIG. 13, the crowd animation may be edited or modified per group consisting of multiple characters included in the crowd. According to one embodiment of the invention, the user may use a sketch-based interface to select a character included in a group. For example, the user may select a color of a sketched line to distinguish a group, and may sketch a shape 1310 to select a character to be included in the group (FIG. 12). According to one embodiment of the invention, the attribute values for a type of motion made by the characters, a motion path 1320 of the characters, and the like may be changed per group via a sketch-based interface.

Figure 14:
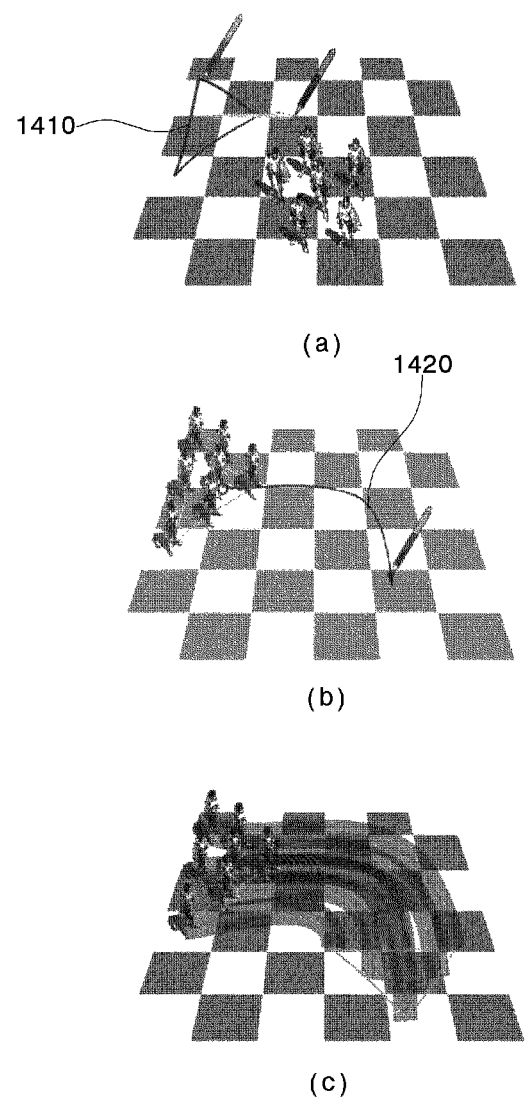

Referring to FIG. 14, a crowd may be specified by a guide shape 1410 as described above, and a motion path of all characters included in the crowd may be specified by a guide path 1420. The crowd animation may be edited or modified per crowd.

Next, according to one embodiment of the invention, with reference to the above-described crowd animation attribute information such as a guide shape, a guide path and a guide field, the animation generation unit 150 may function to generate a crowd animation in which a crowd including at least one character moves, making a motion, in a formation defined by the guide shape and along a motion path defined by the guide path, and makes a predetermined motion with respect to the guide field.

Figure 15:
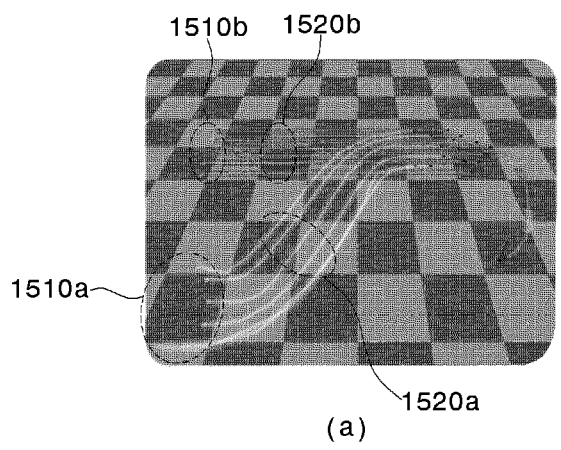
FIG. 15 illustratively shows a crowd animation generated according to one embodiment of the invention.
Figure 15:
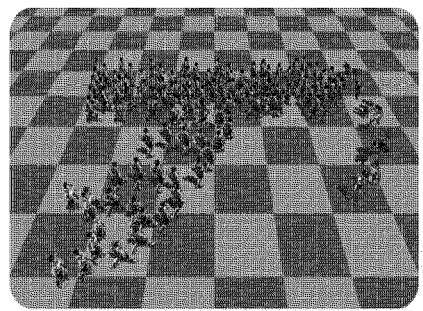

FIG. 15 illustratively shows a crowd animation generated according to one embodiment of the invention.

Referring to FIG. 15, an animation for a crowd moving according to a first guide shape and a first guide path, and an animation for a crowd moving according to a second guide shape and a second guide path, may be respectively displayed.

Meanwhile, the communication unit 160 according to one embodiment of the invention may function to enable the crowd animation generation system 100 to communicate with an external device.

Lastly, the control unit 170 according to one embodiment of the invention may function to control data flow among the guide shape management unit 110, the guide path management unit 120, the guide field management unit 130, the real-time editing management unit 140, the animation generation unit 150, and the communication unit 160. That is, the control unit 170 may control inbound data flow or data flow among the respective components of the crowd animation generation system 100, such that the guide shape management unit 110, the guide path management unit 120, the guide field management unit 130, the real-time editing management unit 140, the animation generation unit 150, and the communication unit 160 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be configured to operate as one or more software modules to perform the processes of the present invention, and vice versa.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for generating a crowd animation, comprising the steps of:
   (a) generating a guide shape for a crowd including at least one character with reference to a first user operation, wherein the guide shape specifies at least one of a formation and a number of the at least one character included in the crowd;
   (b) generating a guide path for specifying a motion path of the at least one character included in the crowd with reference to a second user operation inputted with respect to the guide shape, wherein the guide path further specifies a type of a motion made by the at least one character included in the crowd while moving along the motion path according to how the second user operation is inputted; and
   (c) generating the crowd animation in which the at least one character included in the crowd moves in the formation specified by the guide shape and along the motion path specified by the guide path,
   wherein step (b) comprises the step of:
   (b1) generating a guide field on a virtual plane where the at least one character included in the crowd exists, with reference to a fifth user operation, and
   wherein the at least one character passing the guide field makes a motion that is determined according to a relationship between the guide field and the motion path.

2. The method of claim 1, wherein the first user operation is an operation for specifying a virtual area including the at least one character on a screen.

3. The method of claim 1, wherein the second user operation is an operation for specifying a virtual line running from a first point to a second point on a screen.

4. The method of claim 1, wherein at least one of the first and second user operations is inputted via a sketch-based interface.

5. The method of claim 1, wherein at least one of regularity of the guide shape and variety of the guide path is configured with reference to a third user operation inputted with respect to at least one of the guide shape and the guide path.

6. The method of claim 1, wherein step (a) comprises the steps of:
   (a1) generating a primary guide shape for the crowd including the at least one character with reference to the first user operation; and
   (a2) generating a secondary guide shape for the crowd including the at least one character with reference to a fourth user operation, and
   wherein the formation formed by the at least one character included in the crowd is changed from a formation specified by the primary guide shape to a formation specified by the secondary guide shape.

7. The method of claim 1, wherein at least one of the guide shape and the guide path is capable of being modified per at least one character.

8. The method of claim 1, further comprising the step of:
   (d) changing at least one of the guide shape and the guide path in real time while the crowd animation is displayed, with reference to a sixth user operation inputted while the crowd animation is displayed.

9. The method of claim 8, wherein the sixth user operation includes an operation for specifying an editing shape on a virtual plane where the at least one character included in the crowd exists, and an operation for moving the editing shape on the virtual plane.

10. A system for generating a crowd animation, comprising:
    a guide shape management unit to generate a guide shape for a crowd including at least one character with reference to a first user operation, wherein the guide shape specifies at least one of a formation and a number of the at least one character included in the crowd;
    a guide path management unit to generate a guide path for specifying a motion path of the at least one character included in the crowd with reference to a second user operation inputted with respect to the guide shape, wherein the guide path further specifies a type of a motion made by the at least one character included in the crowd while moving along the motion path according to how the second user operation is inputted;
    an animation generation unit to generate the crowd animation in which the at least one character included in the crowd moves in the formation specified by the guide shape and along the motion path specified by the guide path; and
    a guide field management unit to generate a guide field on a virtual plane where the at least one character included in the crowd exists, with reference to a fifth user operation, wherein the at least one character passing the guide field makes a motion that is determined according to a relationship between the guide field and the motion path.

11. A non-transitory computer-readable recording medium having stored thereon a computer program for executing a method for generating a crowd animation, the method comprising:
    (a) generating a guide shape for a crowd including at least one character with reference to a first user operation, wherein the guide shape specifies at least one of a formation and a number of the at least one character included in the crowd;
    (b) generating a guide path for specifying a motion path of the at least one character included in the crowd with reference to a second user operation inputted with respect to the guide shape, wherein the guide path further specifies a type of a motion made by the at least one character included in the crowd while moving along the motion path according to how the second user operation is inputted; and
    (c) generating the crowd animation in which the at least one character included in the crowd moves in the formation specified by the guide shape and along the motion path specified by the guide path,
    wherein step (b) comprises:
    (b1) generating a guide field on a virtual plane where the at least one character included in the crowd exists, with reference to a fifth user operation, and
    wherein the at least one character passing the guide field makes a motion that is determined according to a relationship between the guide field and the motion path.

12. The non-transitory computer-readable recording medium of claim 11, wherein the first user operation is an operation for specifying a virtual area including the at least one character on a screen and the second user operation is an operation for specifying a virtual line running from a first point to a second point on a screen.

13. The non-transitory computer-readable recording medium of claim 11, wherein at least one of the first and second user operations is inputted via a sketch-based interface.

14. The non-transitory computer-readable recording medium of claim 11, wherein at least one of regularity of the guide shape and variety of the guide path is configured with reference to a third user operation inputted with respect to at least one of the guide shape and the guide path.

15. The non-transitory computer-readable recording medium of claim 11, wherein step (a) further comprises:
(a1) generating a primary guide shape for the crowd including the at least one character with reference to the first user operation; and
(a2) generating a secondary guide shape for the crowd including the at least one character with reference to a fourth user operation, and
wherein the fottnation formed by the at least one character included in the crowd is changed from a formation specified by the primary guide shape to a formation specified by the secondary guide shape.

16. The non-transitory computer-readable recording medium of claim 11, wherein at least one of the guide shape and the guide path is capable of being modified per at least one character.

17. The non-transitory computer-readable recording medium of claim 11, wherein the method further comprises:
(d) changing at least one of the guide shape and the guide path in real time while the crowd animation is displayed, with reference to a sixth user operation inputted while the crowd animation is displayed,
wherein the sixth user operation includes an operation for specifying an editing shape on a virtual plane where the at least one character included in the crowd exists, and an operation for moving the editing shape on the virtual plane.

* * * * *